United States Patent [19]

McLaughlin

[11] Patent Number: 4,759,638

[45] Date of Patent: Jul. 26, 1988

[54] WHEEL WITH PIVOTABLE GROUND PADS

[76] Inventor: Hugh R. McLaughlin, Aberdour, Bray Road, Foxrock, County Dublin, Ireland

[21] Appl. No.: 18,636

[22] Filed: Feb. 25, 1987

[51] Int. Cl.⁴ ............................................. B60B 15/22
[52] U.S. Cl. .......................................... 301/43; 305/4; 305/5
[58] Field of Search ............... 301/43, 44 R, 44 T, 301/45; 305/4, 5, 44, 51, 54

[56] References Cited

U.S. PATENT DOCUMENTS

| | | | |
|---|---|---|---|
| 235,167 | 12/1880 | Nelson | 305/5 |
| 1,144,373 | 6/1915 | Morton | 305/4 |
| 1,264,312 | 4/1918 | Lohman | 305/4 |
| 1,678,530 | 7/1928 | Phillips | 305/5 X |
| 1,921,537 | 8/1933 | Osman et al. | 305/5 |

FOREIGN PATENT DOCUMENTS

| | | | |
|---|---|---|---|
| 558818 | 3/1957 | Italy | 301/45 |
| 48349 | 10/1918 | Sweden | 305/4 |

Primary Examiner—James B. Marbert
Attorney, Agent, or Firm—Sughrue, Mion, Zinn, Macpeak and Seas

[57] ABSTRACT

A wheel comprises a hub 11 and a plurality of ground-engaging pads 16 disposed around and coupled to the periphery of the hub by radial studs 17. Each pad is capable of at least a limited degree of angular displacement about the axis of its stud 17 whereby the hub may turn through such angle relative to any pad currently in ground contact. A resilient stop 30 is associated with each pad to return each pad to its undisplaced position when the pad has moved out of contact with the ground. In an alternative embodiment a resilient member between the hub and the pad serves to both limit angular displacement and return the pad to its undisplaced position.

4 Claims, 11 Drawing Sheets

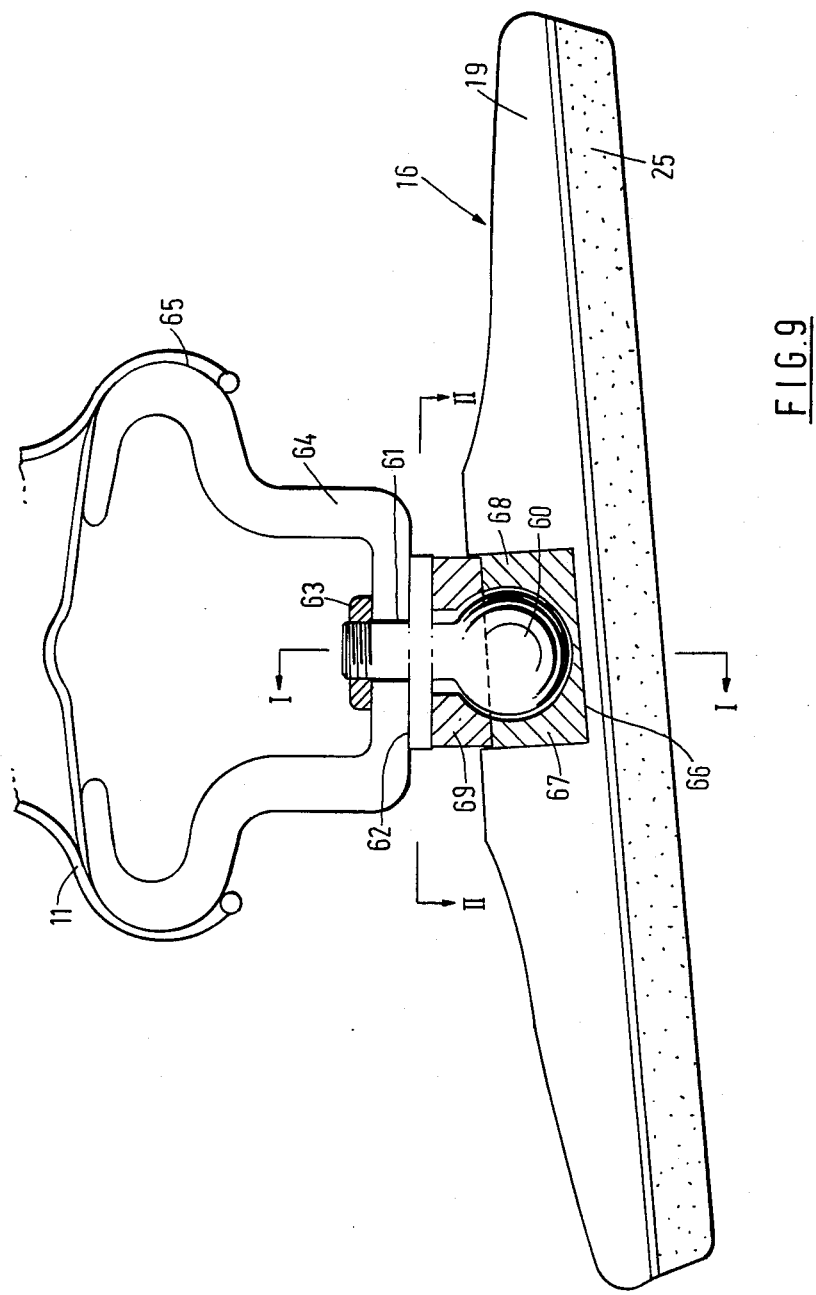

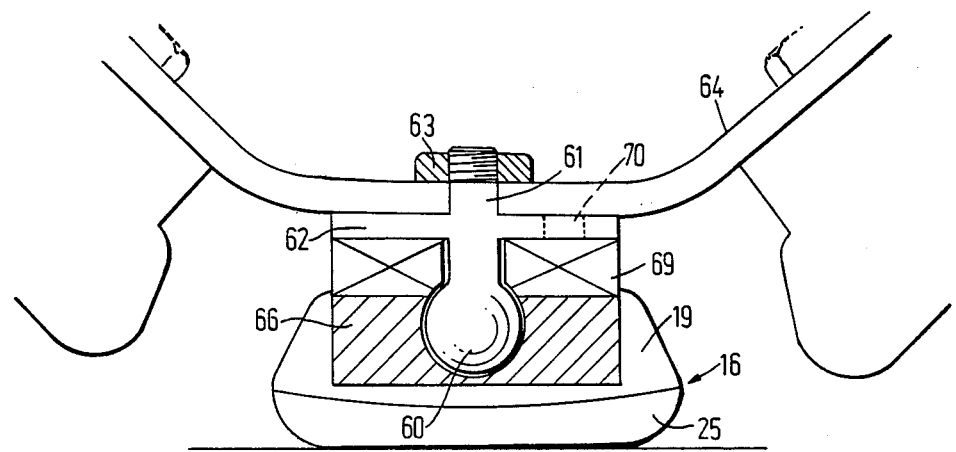
F I G. 10
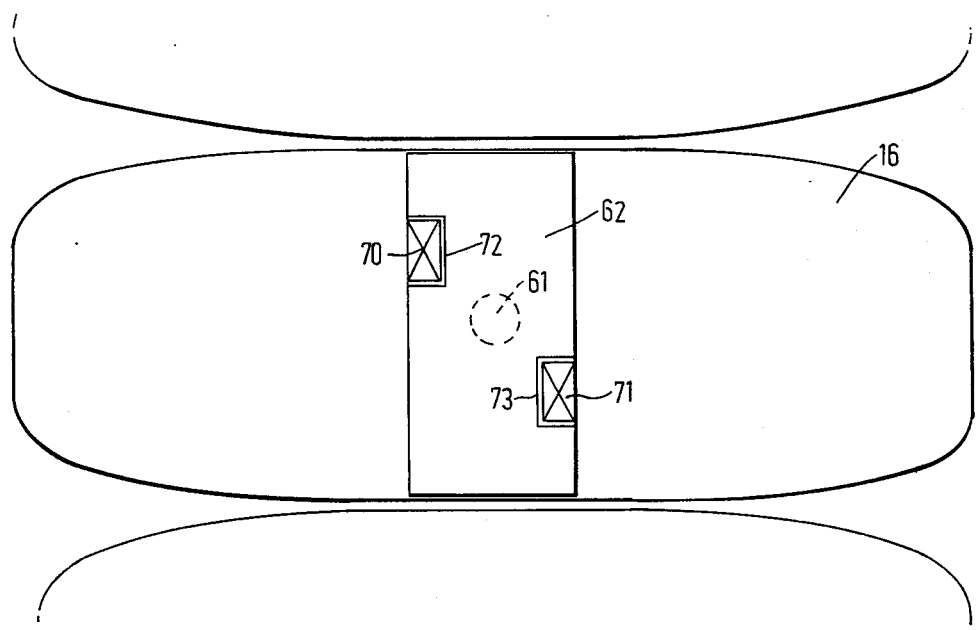
F I G. 11

WHEEL WITH PIVOTABLE GROUND PADS

BACKGROUND OF THE INVENTION

This invention relates to improvements in wheels for machines which normally require wide faced tyres for the purpose of spreading the load carried over grass covered ground or other soft surfaces, for example, golf greens. In particular, the invention relates to improvements in wheels for use on golf carts and grass mowing machines.

The wheels used on such golf carts and grass mowing machines usually have a conventional pneumatic tyre and the overall diameter of the wheel and tyre is approximately eighteen (18) inches, the tyre having a curved ground engaging surface of approximately eight (8) inches in width. The width of the tyre is necessarily restricted since the wider the tyre is, then the greater is the scourging effect on the ground when the wheel is turning. The scourging of the ground is caused by the wheel when turning as the outer part of the wheel must effectively rotate faster than the inner part, since the former has in effect to travel a greater distance. Since the outer part of the wheel cannot rotate faster than the inner part, the wheel skids and this skidding scourges the ground surface. However, even a wheel having a width of eight (8) inches substantially scourges the ground when turning. This is particularly the case on golf fairways.

The scourging of the ground is accentuated by the weight which the wheel carries and which is exerted on the ground surface.

Golf carts are generally used to carry two golf players and two golf bags with clubs, and have a gross weight including players, bags and clubs of approximately one thousand two hundred pounds (1200 lbs). The golf carts usually have four wheels with pneumatic tyres. Due to the rounded face of the tyres the combined weight carried by the wheels is spread over a weight bearing area of only sixteen (16) square inches per wheel. This represents an area of the ground engaging surface of each tyre, which actually contacts the ground surface at any instant, of only four (4) inches wide and four (4) inches in the direction of travel. Thus, for a four-wheeled golf cart of a combined weight of one thousand two hundred pounds (1200 lbs) this represents approximately nineteen (19) pounds per square inch (19 p.s.i.) of pressure on the ground surface. This pressure damages the ground surface and aggravates the scourging effect when the wheels are turning. The main disadvantages of using existing wheels for golf carts and grass mowing machines are:

1. The daily use of such heavy machines on fairways and greens causes damage to the grass covered ground surface, particularly when turning.
2. In wet or saturated ground conditions golf course management are often compelled to close the course, thereby causing serious financial loss to the club.
3. Due to the foregoing two disadvantages some clubs are reluctantly forced to build cement paths over large sections of the course. These paths are to the disadvantage of the players, are considered ugly, and in affect the run of play as the players cannot directly follow the direction in which the ball has been played and thus the game is considerably slowed down.

SUMMARY OF THE INVENTION

Thus, it is an object of the present invention to mitigate the above mentioned disadvantages of existing wheels, and to provide a wheel in which the weight carried may be spread over a considerably larger area and in which scourging of the ground surface during turning is substantially reduced or eliminated.

According to the invention there is provided a wheel comprising a hub and a plurality of ground-engaging pads disposed around and coupled to the periphery of the hub, the coupling means for each pad being adapted to permit each pad at least limited degree of angular displacement about a radial axis relative to the hub whereby the hub may turn through the said limited angle relative to any pad currently in ground contact, and the coupling means further being adapted to return each pad to its undisplaced position when the pad has moved out of contact with the ground.

BRIEF DESCRIPTION OF THE DRAWINGS

Embodiments of the invention will now be described by way of example with reference to the accompanying drawings, in which:

FIG. 9 is a cross-sectional view of part of a fifth embodiment of the invention as viewed from the front of the wheel;

FIG. 10 is a cross-sectional side view of the wheel of FIG. 9, taken on the line I—I, and FIG. 11 is a plant view of the coupling mechanism of FIGS. 9 and 10 taken on the line II—II of FIG. 9.

DETAILED DESCRIPTION OF THE PREFERRED EMBODIMENTS

Figure 1:
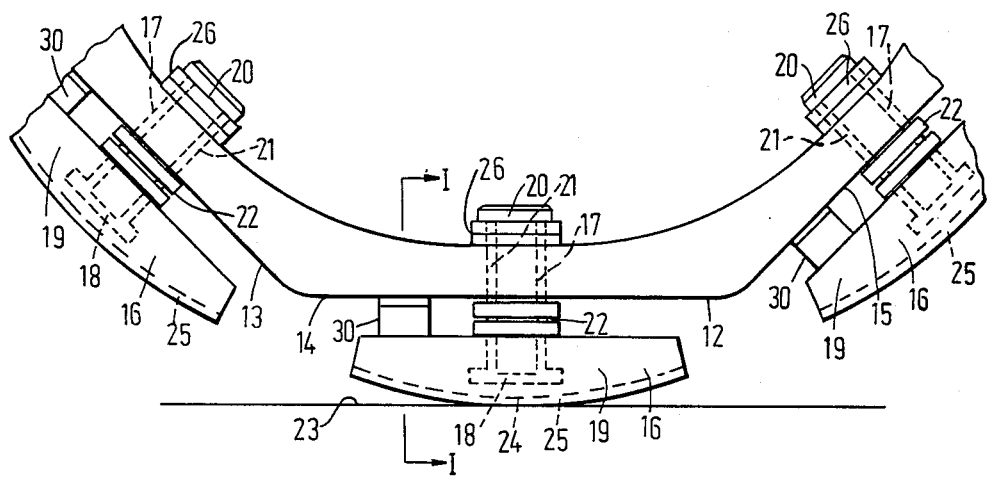
FIG. 1 is a diagrammatic side view of a portion of a wheel according to a first embodiment of the invention.
Figure 2:
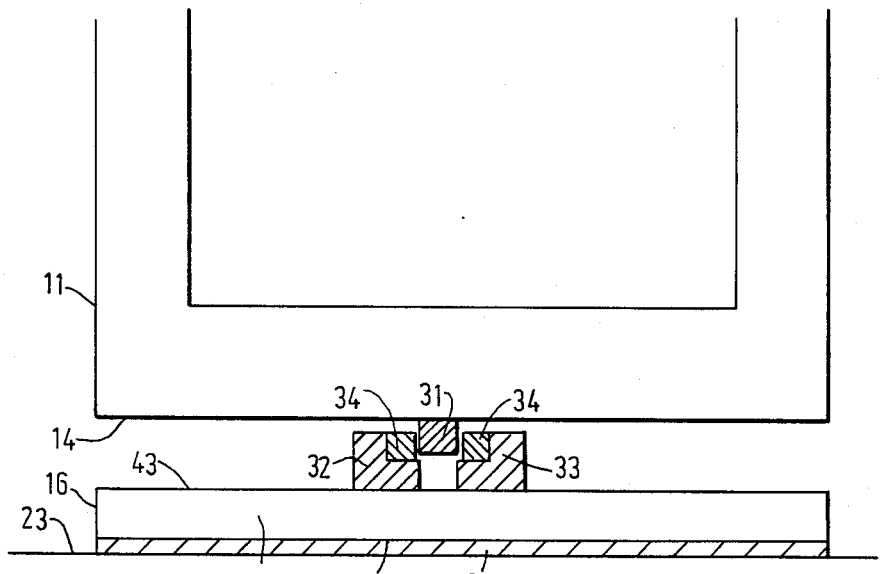
FIG. 2 is a diagrammatic sectional view along the lines I—I in FIG. 1.

Referring now to the drawings, wherein similar numerals have been used to indicate like parts, and referring in particular to FIGS. 1 and 2, there is shown therein a wheel generally indicated at 10 according to a first embodiment of the invention. The wheel 10 comprises a hollow generally cylindrical hub member 11 having an outer surface 12 which is formed having an octagonal shape, having eight flat faces only three of which are shown at 13, 14 and 15. A ground engaging pad 16 is mounted on each of the eight faces of the hub member by means of a stud 17. One end 18 of each stud 17 is non-rotatably fixed in a conventional manner in the centre of a substantially solid rigid part 19 of a respective pad 16, and the other end 20 of each stud passes through an aperture 21 in the hub member 11 and is retained on the inside thereof against a thrust bearing 26. A further thrust bearing 22 is mounted on each stud 17 between the pad 16 and the respective face of the hub member. The thrust bearings 22 and 26 enable the hub member 11 to rotate about the associated stud 17 when the respective pad 16 is engaged on the ground surface 23. The outer surface 24 of each of the pads 16 is curved in the circumferential direction of the hub member 11 and has fixed thereon a rubber covering 25 which engages the ground surface during rotation of the wheel 10.

The wheel 10 further has stop means 30 associated with each pad 16 to restrict the angular rotation of the hub member 11 relative to the pads 16. Each stop means 30 comprises a stop member 31 fixed on the respective face of the hub member and a pair of guide members 32,33 which face each other and are fixed on the upper surface 43 of each of the pads 16. The portions 34 of he guide members are resilient and can be compressed by the stop member 31 as the hub member 11 is turned relative to the pad 16. The guide members 32,33 serve to limit the angular rotation of the hub member relative to the pads 16. The guide members are preferably designed and located to enable the hub member 11 to rotate approximately 5° left or right relative to the pads 16, although a greater angle can be permitted by appropriate design. It will be appreciated that the hub member will in use only rotate relative to one of the pads 16 at a time, this pad being the one which is currently engaged on the ground surface. Furthermore, although only one stop means 30 has been shown for each pad, it will be understood that a similar stop means may be provided on each pad symmetrically on the opposite side of the stud.

When the hub member 11 is rotated relative to that one of the pads 16 in contact with the ground surface, the stop member 31 will engage with one of the guide members 32,33 and limit further rotation of the hub member. Typically, the hub member 11 can rotate only 5° during the period of contact of one of the pads 16 on the ground surface. When the wheel 10 rotates sufficiently for that pad 16 which was in contact with the ground surface to move out of contact with the ground surface this pad then moves back into alignment with the hub member. This return movement is caused by the stop member 31 compressing the portion 34 of one of the guide members 32,33 when the hub member is rotated, and when the pad has moved out of ground contact the portion 34 of the guide member which was compressed returns to its initial shape thus forcing the pad into alignment with the hub member once again.

In use, a plurality of such wheels 10 are mounted in conventional manner on a golf cart or other machine in substitute for the existing wheels. During rotation of the wheels 10, each pad engages the ground surface in turn and the hub member 11 can be rotated approximately 5° during engagement of each pad on the ground. Therefore, with a wheel having eight pads, as in the present case, the wheel can turn through 40° during one full revolution and it can turn through 180° during 4.5 revolutions. In the case of a wheel of diameter 16 inches each pad would have a length along the wheel circumference of approximately 5 inches with a distance of approximately ⅛ inch between pads at their centres and up to 1 inch at their outer edges. The advantage of the invention is that the wheel can turn without the pad which in contact with the ground surface actually turning and, therefore, friction with the ground surface is substantially eliminated. In view of this, the actual surface area of the pad 16 which is in contact with the ground surface can be much greater than the same area of a conventional wheel and therefore the pressure exerted per unit area on the ground is substantially reduced. For example, with a pad of a width of 12 inches and having a length in the direction of travel of 4 inches in contact with the ground this provides an area of 48 sq. inches for each wheel. Thus, for a four-wheeled golf cart having a total weight of 1200 lbs (including players and golf clubs) this represents approximately 6 lbs p.s.i. of pressure on the ground compared to about 19 lbs p.s.i. for conventional wheels.

Figure 3:
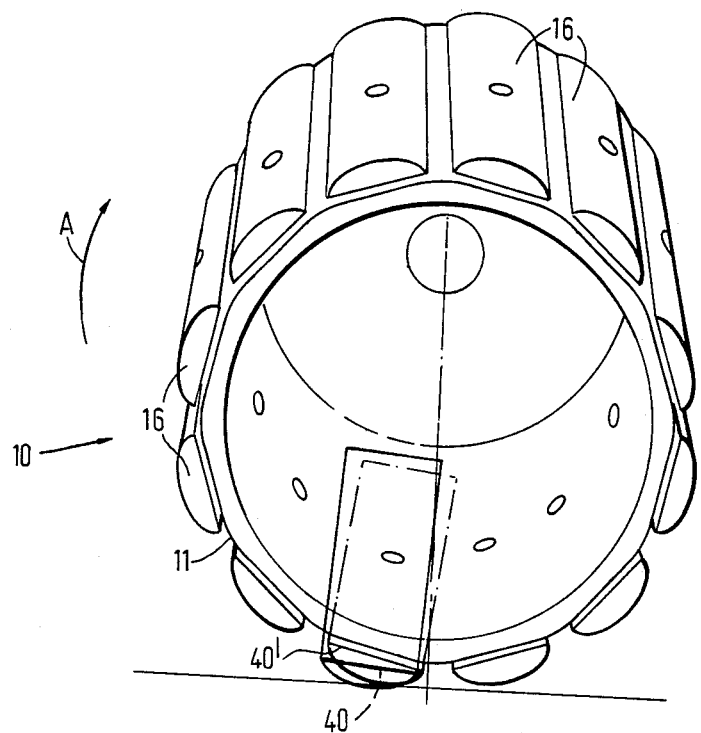
FIG. 3 is a diagrammatic perspective view of a second embodiment of a wheel according to the invention.

Referring now to FIG. 3 there is shown a second embodiment of the invention comprising a wheel 10 having a hub member 11 which has twelve pads 16 mounted thereon as hereinbefore described. As this wheel has twelve pads it can turn through 60° during one revolution. The wheel is shown having just turned on one of the pads 40, shown in unbroken outline. Prior to turning the pad 40 will have engaged on the ground as shown indotted outline at 40'. The hub member 11 has rotated through 5° in the direction of arrow A leaving the pad 40 now out of alignment with the direction of travel. As the wheel rotates further the pad 40 is moved upwards out of ground contact and returns as hereinbefore described to a position in line with the direction of travel.

Figure 4:
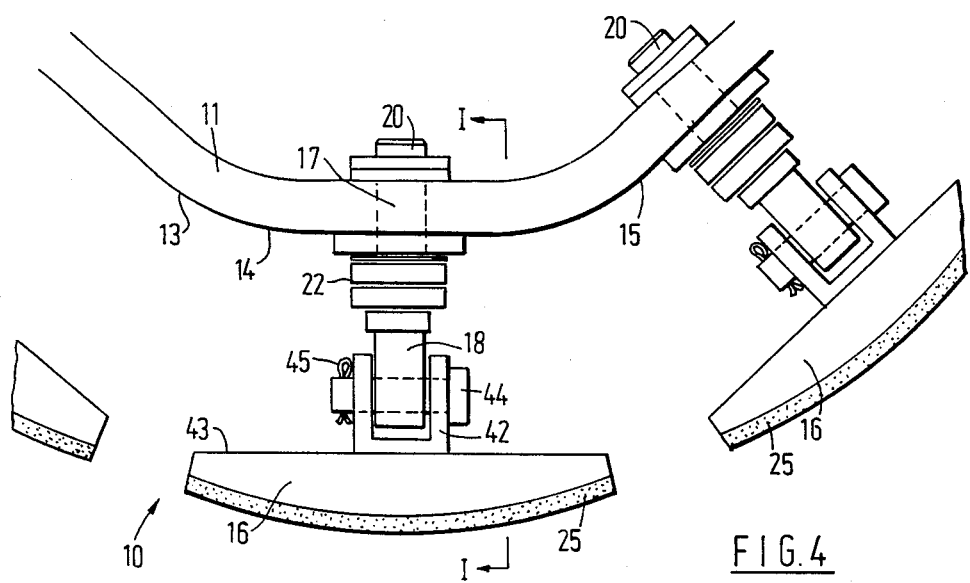
FIG. 4 is a diagrammatic side view of a portion of a wheel according to a third embodiment of the invention.
Figure 5:
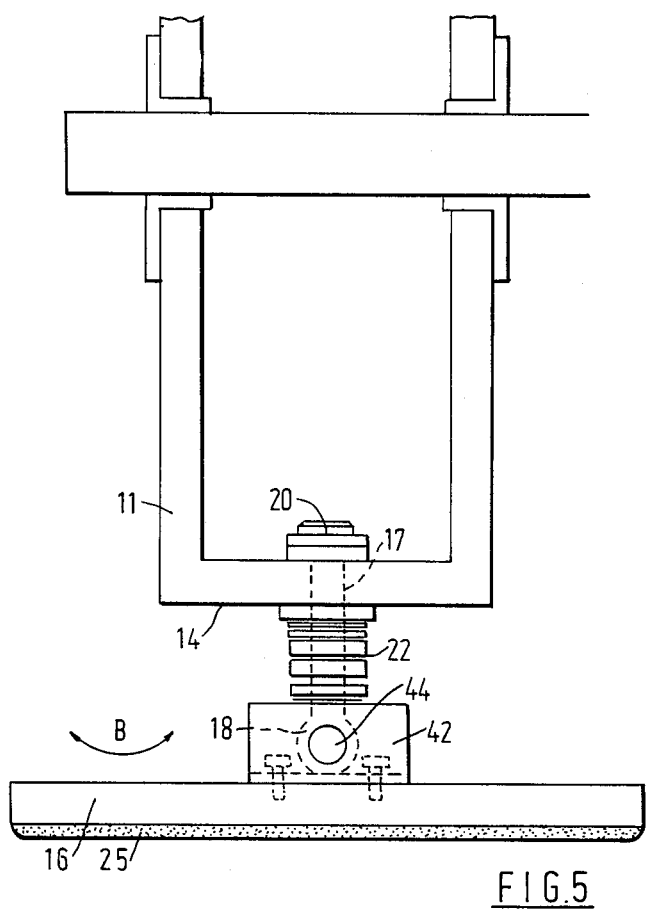
FIG. 5 is a diagrammatic sectional view along the lines I—I in FIG. 4.

Referring now to FIGS. 4 and 5 there is shown therein a second embodiment of the invention. In this embodiment of the invention, the pad 16 carries a 'U' shaped bracket 42 on its upper surface 43. The lower end 18 of the stud 17 is pivotally mounted on a bolt 44 which is secured on the bracket 42 by means of a pin 45 in conventional manner. Thus, the pad 16 can pivot laterally about the stud 17 in the directions of arrow B i.e. about an axis parallel to the direction of travel. This is desirable if the wheel is moving over uneven or sloping ground so that the pad 16 can lie substantially flat on the ground surface to prevent any scourging of the ground. As shown in FIG. 5 the pads 16 may be substantially greater in width than the hub member 11. The other constructional features of this embodiment are the same as that shown in FIG. 1 and 2 and therefore only the differences in the present embodiment have been described.

Figure 7:
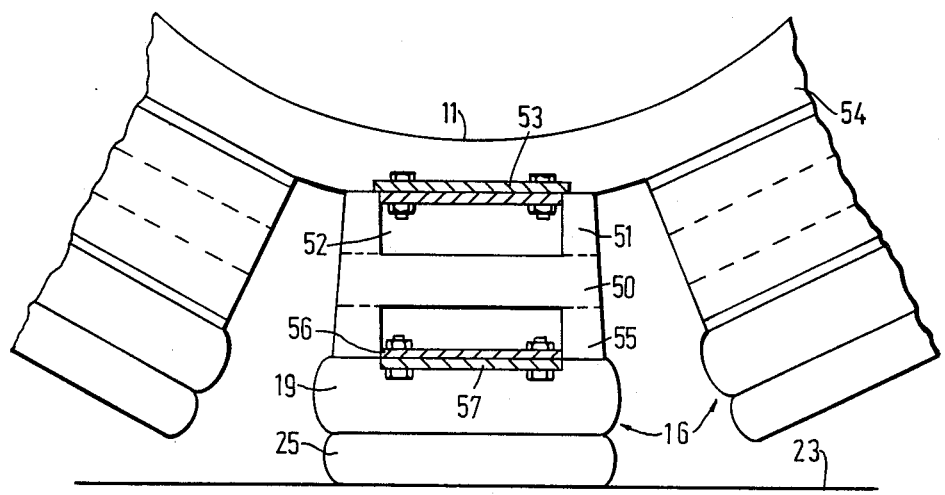
FIG. 7 is a cross-sectional side view of the wheel of FIG. 6, taken on the line I—I.
Figure 8:
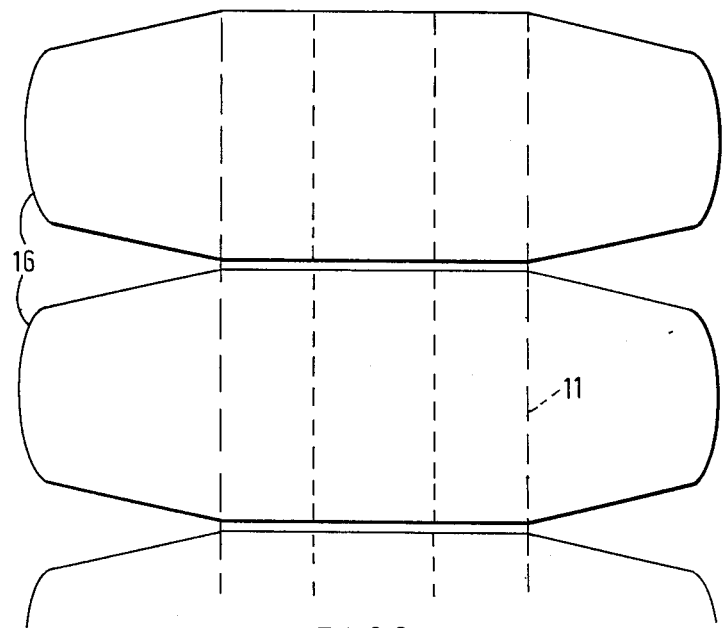
FIG. 8 is a plan view of the pads of the wheel of FIG. 6.
Figure 6:
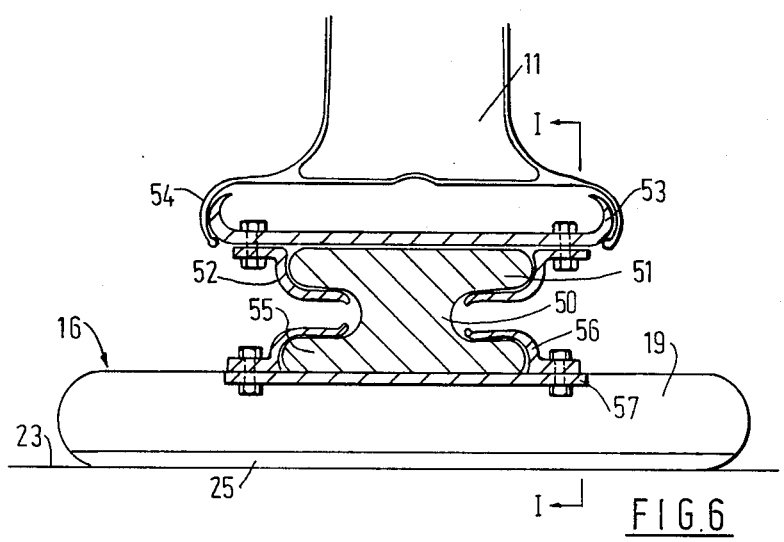
FIG. 6 is a cross-sectional view of part of a fourth embodiment of the invention, as viewed from the front of the wheel.

FIGS. 6 to 8 show a further embodiment of the invention.

In this embodiment, the stud 17 is replaced by a rubber member 50 which is generally of H-shaped cross-section as viewed in the direction of travel of the wheel, i.e. as seen in FIG. 6. The upper side 51 of the member 50 is connected by a clamp 52 to a plate 53 which fits inside the rim 54 of the hub 11, and the lower side 55 of the member 50 is connected by a further clamp 56 to a plate 57 set in the inner surface of the rigid part 19 of the pad 16. Thus the sides of the H-shaped member are rigidly fixed to the hub and pad respectively.

The relatively narrow centre part of the H-shaped member 50 is designed for resilient deformation to permit the pad 16 a limited degree of angular displacement, typically 5 degrees but it may be more, about a radial axis relative to the hub, so that as in the case of the previous embodiments the hub may turn by this amount while the pad is in contact with the ground. Clearly, when the pad leaves the ground, the deformation of the member 50 is relieved and the pad re-assumes its undisplaced position as the member 50 returns to its undeformed shape.

Clearly the member 50 will also allow the pad 16 to tilt laterally relative to the direction of travel of the wheel, and also will permit fore and aft tilting of the pad.

FIG. 8 shows a schematic plan view of the pads of FIGS. 6 and 7. Each pad is about 12 inches wide by 5 inches in the circumferential direction of the wheel, and is spaced from its neighbours by about ⅛ inch at the centre and about 1 inch at the outer edges. It will be noted that in this regard FIGS. 6 and 7 ar not to scale.

FIGS. 9 to 11 show a fifth embodiment of the invention.

In this embodiment, the hub 11 is coupled to the pad 16 by a ball and socket joint, providing both fore and aft and side to side tilting, as well as angular displacement about a radial axis.

The joint comprises a ball 60 attached to a shaft 61 having a flange 62 rigidly attached thereto. The shaft 61 is bolted at 63 to a member 64 which fits inside the rim 65 of the hub 11, the flange 62 abutting tightly against the member 64.

The joint further comprises a socket 66, formed in two parts 67 and 68, which closely surround the ball 60 and are set into the portion 19 of the pad 16.

A rubber block 69 is sandwiched between the hub and the pad, in particular between the flange 62 and the socket 66, with the block 69 surrounding the shaft 61 of the ball 60.

The block 69 will yield resiliently to permit tilting of the pad 16 as aforesaid when the pad is in contact with the ground, but when the pad 16 moves out of contact with the ground the block 69 will reassume its undistorted condition and restore the pad to its untilted condition.

Since the block 69 is only fixed to the top surface of the socket 66 but not to the flange 62, it would not in itself reliably limit the angular displacement of the pad 16 when the wheel is turning with the pad in contact with the ground, nor reliably return the pad to its undisplaced position when the pad has moved out of contact with the ground.

Accordingly, two projections 70 and 71 are provided on the upper surface of the block 69 as shown in FIG. 11 and these engage in recesses 72 and 73 respectively of the flange 62. Thus the block 69 is keyed to the flange 62, and is therefore effectively non-rotatably connected to both the flange 62 and the socket 66. Thus the block 69 is by this means able to limit the angular displacement of the pad 16 and returns the pad to the undisplaced position.

Apart from the benefits of the invention already described other advantages include;

(1) The outer rubber covering 25 will last considerably longer than existing tyres as most friction at ground level is eliminated.
(2) The surface area of the pads 16 may be substantially increased to carry a relatively higher weight than that already mentioned for golf carts.
(3) The invention will also apply to wheels for grass curring machines particularly those known by the name TRIPLEX. Most golf clubs are reluctant to use these types of grass cutting machines because the wheels which they have actually wear a circular path around the greens.
(4) A particularly important use of the invention will be for wheels for heavy farm machinery. At present, most farm machinery using existing wheels cannot be used in unduly wet or soggy ground conditions as they tend to dig into the ground or slip. On many farms, even when grass can be mowed, the ground is often so wet that it will not take silage making machinery, not even a tractor or buckrake, except perhaps a small tractor with double wheels on the back. The invention overcomes this problem as the use of the wide pads 16 enables the weight carried to be distributed over a larger area thus, reducing the pressure on the ground.

I claim:

1. A wheel, comprising: a hub, and a plurality of ground-engaging pads disposed around and individually coupled to a periphery of the hub and by an equal plurality of coupling means interposed between and non-rotatably connected at each side relative to the hub and the pad, respectively, each coupling means comprising a resilient member having a generally H-shaped cross-section in a direction of travel of the wheel, with one side of the H-shaped member connected to the hub and another side connected to the respective pad, the H-shaped member being adapted by resilient deformation thereof to permit the pad at least a limited degree of angular displacement about a radial axis relative to the hub such that the hub may turn through said limited angle relative to the pad when the pad is in contact with the ground, and being adapted to return the pad to its undisplaced position by relief of said deformation when the pad has moved out of contact with the ground, each H-shaped member further being adapted to permit the respective pad to tilt laterally relative to the direction of travel of the wheel.

2. A wheel, comprising: a hub, and a plurality of ground-engaging pads disposed around and individually coupled to a periphery of the hub by an equal plurality of coupling means interposed between and non-rotatably connected at each side relative to the hub and the pad, respectively, each coupling means comprising a resilient member which is adapted by resilient deformation thereof to permit the pad at least a limited degree of angular displacement about a radial axis relative to the hub such that the hub may turn through said limited angle relative to the pad when the pad is in contact with the ground, and which is adapted to return the pad to its undisplaced position by relief of said deformation when the pad has moved out of contact with the ground, each resilient member further being adapted to permit the respective pad to tilt laterally relative to the direction of travel of the wheel, and each coupling means comprising a ball and socket joint extending through the resilent member.

3. A wheel, comprising: a hub, and a plurality of ground-engaging pads disposed around and individually coupled to a periphery of the hub by an equal plurality of coupling means, each coupling means being adapted to permit the respective pad at least a limited degree of angular displacement about a radial axis relative to the hub such that the hub may turn through said limited angle relative to the pad when the pad is in contact with the ground, and further being adapted to return each pad to its undisplaced position when the pad has moved out of contact with the ground, wherein the each coupling means comprises a radial stud connected at one end to the hub and at another end to the respective pad, the pad being rotatable about the axis of the stud, the coupling means further including a resilient stop means for limiting the angular rotation of the pad about the axis of the stud and for retaining the pad to the undisplaced position.

4. A wheel according to claim 3, wherein the pad is pivotally connected to the stud to permit lateral tilting of the pad.

* * * * *